June 18, 1968      C. E. QUINN      3,388,773

VEHICLE BRAKE LINING WEAR INDICATING DEVICE

Filed Nov. 3, 1966

INVENTOR.
Clark E. Quinn
BY
Charles R. Engle
ATTORNEY

United States Patent Office 3,388,773
Patented June 18, 1968

3,388,773
VEHICLE BRAKE LINING WEAR
INDICATING DEVICE
Clark E. Quinn, Rochester, Mich., assignor to General Motors Corporation, Detroit, Mich., a corporation of Delaware
Filed Nov. 3, 1966, Ser. No. 591,842
6 Claims. (Cl. 188—1)

ABSTRACT OF THE DISCLOSURE

A brake lining wear indicating device including a modified automatic brake shoe adjuster which varies a resistance in a circuit to an electrical indicator. The indicator can be read at any stage of brake lining wear. The modified automatic adjuster also includes switch contacts that are closed to energize a signal when the linings are completely worn.

---

This invention relates to a brake lining wear indicating device and, more particularly, to an indicator providing both analog output and full lining wear signals.

Various brake lining wear indicating devices have been constructed heretofore with a vast majority of them being of a type to afford a signal when the brake lining has become completely worn. Such devices have not provided a means for determining the amount of lining wear at any stage or phase of use. Therefore, it has been necessary to remove the vehicle wheel and visually inspect the lining at intermediate stages of wear to obtain such information.

The purpose of this invention is to eliminate the need for a visual inspection by providing an indicating structure that can be readily inserted within a slightly modified conventional brake shoe adjuster to provide an indication of lining wear by producing an analog signal which can easily be read directly on a calibrated electrical meter. It is evident that such a reading can be accurate at all stages of lining wear and can be readily obtained as other services, such as lubrication, are being conducted on the vehicle.

Accordingly, among the objects of the invention is the provision of a brake lining wear indicator which provides an analog type output signal.

Another object of the invention is the provision of an indicator that can be readily installed to cooperate with and utilize parts of a conventional automatic brake shoe adjuster.

A further object of the invention resides in a brake lining wear indicator providing both an analog output signal and a signal indicating that complete wear has occurred.

Another object of the invention is the provision of an indicator that may be easily connected to an electrical meter while the vehicle is being serviced.

Still another object of the invention is the provision of a brake lining wear indicator that measures the adjusted status of an automatic brake shoe adjuster to accurately determine brake lining wear.

The above objects, characteristic features, and advantages of the invention are further amplified in the following description which, by way of example, reference is made to the accompanying drawings in which.

Figure 1:
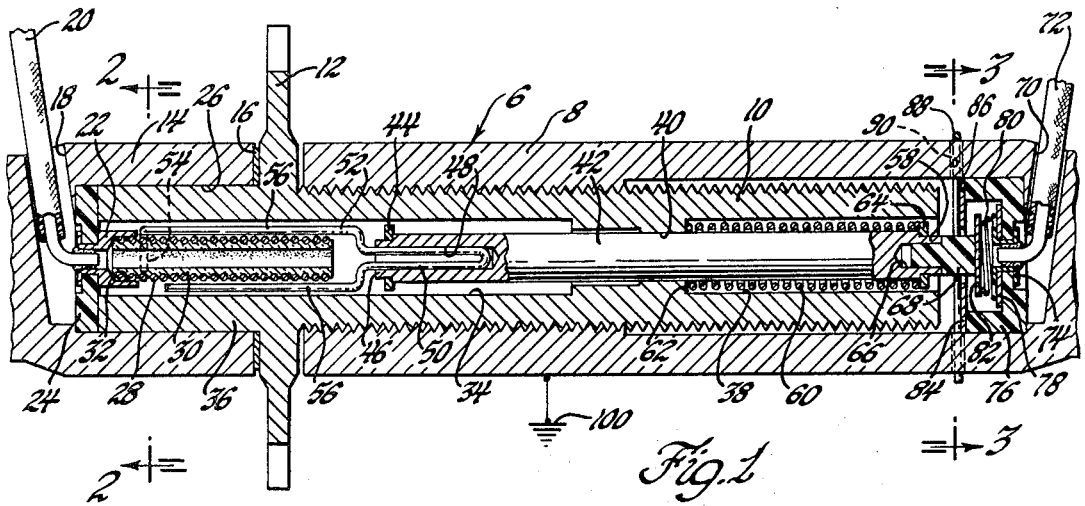
FIGURE 1 is a sectional view of a conventional brake shoe adjuster with portions of the indicator mechanism assembled therein.

Automatic brake shoe adjuster assembly 6 shown in FIGURE 1 includes a first tubular member 8 that threadably receives a second tubular member 10 which in turn includes an integral adjusting wheel 12. The adjusting wheel 12 is rotatably mounted within a non-rotatable cylinder cap member 14 and bears against a friction reducing bearing 16 placed between it and the cap member. The first tubular member 8 and the cap member 14 are each connected to conventional brake shoe assemblies, not shown, whereby the brake shoes are adjusted by rotation of wheel 12 to expand the brake shoes as brake lining wear occurs.

The cylindrical cap member 14 is modified in accordance with this invention to contain a radially extending bore 18 which receives an electrical lead 20. The lead 20 is connected to an electrically conductive bushing 22 which is crimped within an insulator disc 24 positioned at the end of bore 26 in cap member 14. A coil resistor 28 is tightly assembled upon a cylindrical support 30 and the assembly is then inserted within a cavity 32 in bushing 22 to be frictionally retained therein. The second tubular member 10 has a first axial bore 34 extending partially therethrough which receives the aforementioned bushing 22 and coil resistance 28 so that a portion 36 of tubular member 10 positions insulator disc 24 at the bottom of the bore 26 in cap 14.

Figure 2:
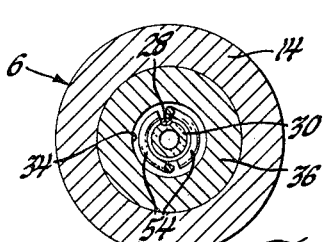
FIGURE 2 is a sectional view taken on line 2—2 of FIGURE 1.

A second axial bore 38 is provided within tubular member 10 and is axially aligned with bore 34 so that a bearing area 40 is positioned between the two bores to slidably support a rod 42. The rod 42 extends into bore 34 and has a conductive guide washer 44 secured adjacent end 46. A recess 48 in the rod end 46 tightly frictionally receives a looped section 50 of a spring type electrical contact assembly 52. The contact assembly 52 has one or more arcuate wiping members 54 which are spring biased by arms 56 into sliding contact with the exterior surface of coil resistor 28 as best shown in FIGURE 2.

End 58 of rod 42 extends into the second axial bore 38 and is biased by a compressed spring 60 which engages shoulder 62 in the bore 38 and a conductive washer 64 secured adjacent rod end 58. The rod end 58 contains a recess 66 which frictionally receives and retains a portion of an electrically non-conductive extension plug 68.

Figure 3:
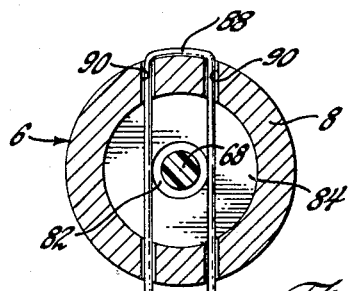
FIGURE 3 is a sectional view taken on line 3—3 of FIGURE 1.

A second substantially radially extending bore 70 is provided in tubular member 8 of the adjuster assembly 6 to receive a second electrical lead 72 which is secured within a conductive bushing 74. The conductive bushing 74 is crimped or otherwise fastened within an insulating cup 76. A conductive washer 78 is fastened to the cup 76 by bushing 74 and is engaged by one end of a conical coil spring 80. The spring 80 engages and biases a first conductive switch plate 82 against one end of non-conductive extension plug 68. A second conductive switch plate 84 engages a face 86 of insulator cup 76 and is retained in this position by a U-shaped locking pin 88, which is placed in transverse bores 90 in the first tubular member 8 as best shown in FIGURE 3.

From the above description it is apparent that adjusting wheel 12 is actuated in a conventional manner to increase the axial length of the adjusting assembly 6 as brake lining wear occurs. This axial expansion is created by relative rotation between the first tubular member 8 and the second tubular member 10 as the latter rotates against the friction reducing bearing 16. As the adjusting assembly 6 is expanded the initially compressed spring 60 also expands to maintain rod 42 in a substantially fixed position relative to tubular member 10. Since the coil resistance 28 is connected to the insulator disc 24 by bushing 22, it moves axially with tubular member 10 and the wiping fingers 54 of contact assembly 52 slide along and are positioned on the surface of coil resistance 28 in relation to the degree of brake lining wear.

An electrical circuit is completed from the source lead 20 through bushing 22, coil resistance 28, wiping fingers 54, contact assembly 52, rod 42, washer 64, spring 60, through shoulder 62 of member 10 and through tubular member 8 to ground 100. Therefore, the effective resistance of coil 28 is directly correlated to brake lining wear as the wiping contact fingers 54 are positioned on the coil in relation to the expansion of adjuster assembly 6.

At the other end of rod 42, the switch plate 84 is fixed to tubular member 8 by locking pin 88 and moves therewith during expansion of adjuster assembly 6. When tubular members 8 and 10 have expanded to position wipers 54 near the free end of resistor 28, the metal washer 44 attached to rod 42 engages the bottom of bore 34. Further lining wear and consequent expansion of adjuster assembly 6 causes rod 42 to move with tubular member 10 so that insulator 68 moves to the left whereby spring 80 will eventually bias switch plate 82 into contact with switch plate 84 energizing a signal, such as light 106 in FIGURE 4, indicating the need for lining replacement. A circuit to such signal is completed through source lead 72, bushing 74, washer 78, conical spring 80 and switch plates 82 and 84 to the grounded tubular member 8.

Figure 4:
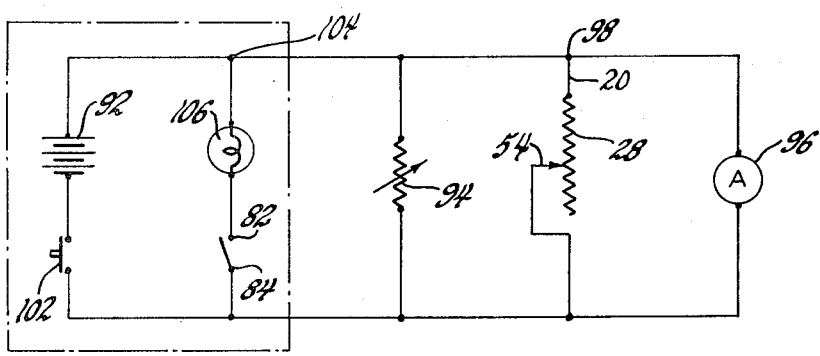
FIGURE 4 is a circuit diagram incorporating the invention.

Referring now to FIGURE 4, an operative electrical circuit embodying the invention is shown to include a source 92 which is connected to a resistance 94 that is adjusted to calibrate an ammeter 96. The electrical lead 20 is connected at junction 98 and the circuit is completed through a ground connection shown at 100 in FIGURE 1. A push button switch 102 is provided in the circuit whereby a service station operator merely connects the lead 20 to a source and actuates button 102 to obtain a reading on ammeter 96 which has previously been calibrated by the adjustable resistance 94 so that the analog type resistor, composed of coil 28 and the sliding contact assembly 52, provides an accurate indication of brake lining wear at any point during wear progression. It is obvious that the ammeter 96 may be provided with any type scale to precisely indicate the condition of the brake linings.

With reference to the portion of the circuit shown in broken lines, the second electrical lead 72 can be connected to the source 92 at junction 104, with the switch plates 82 and 84 being connected to ground at 100 through tubular member 8, as shown in FIGURE 1. Therefore, when the switch 102 is manually closed and brake lining wear has progressed to a sufficient degree to close contacts 82 and 84, this portion of the circuit energizes a signal light 106 to inform the attendant that the brake linings need replacing. Of course it is evident that this latter portion of the circuit can be used with the analog readout previously discussed and as shown in FIGURE 4 or it could be used as an independent checking arrangement. In the alternative, within the scope of this invention, is the use of the switching arrangement including switch plates 82 and 84 to automatically inform the operator that the brake linings are completely worn. The source 92 in such use would be the vehicle battery and a conventional brake actuated switch would replace manually operated switch 102.

While a preferred embodiment of the subject invention has been described in detail above, this description has been provided for purposes of illustration only and is not intended to limit the invention other than as required by the following appended claims.

I claim:
1. A brake lining wear indicating mechanism comprising a brake shoe adjuster that automatically compensates for brake lining wear, variable resistance means responsive to movement of the adjuster as compensation for lining wear takes place, and indicating means in an electrical circuit with said resistance means whereby the movement of said adjuster varies said resistance means so that said indicating means is positioned to illustrate the degree of lining wear.

2. The brake lining wear indicating mechanism of claim 1 wherein said brake shoe adjuster comprises a first tubular member, a second tubular member threadably received therein and movable relative thereto as to the brake shoes are adjusted, said variable resistance means comprising a wire coil connected to one of said tubular members and a spring biased contact slidable on said coil whereby the relative movement of said tubular members varies the effective resistance to said indicating means.

3. The brake lining wear indicating mechanism of claim 2 wherein said coil resistance is disposed within an axail bore in said one tubular member and said spring sliding contact member overlaps said coil resistance and is secured to a plunger disposed within said bore.

4. The brake lining wear indicating mechanism of claim 3 wherein said plunger is positioned by a compressed spring as the brake shoe adjuster expands to regulate the positioning of said sliding contact member on said coil resistance.

5. A brake lining wear indicating mechanism comprising a brake shoe adjuster that automatically compensates for brake lining wear, said brake shoe adjuster comprising a first tubular member, a second tubular member threadably received within said first member and rotatable relative thereto as the brake shoes are adjusted, and sensing means comprising a switch including contact member movable with one of said tubular members, and a second contact member maintained in a relatively fixed position whereby sufficient movement of the adjuster closes said contacts to electrically energize said indicating means when the brake lining wear has progressed a predetermined degree.

6. The brake lining wear indicating mechanism of claim 5 wherein an electrically conductive spring positions said second contact member.

References Cited

UNITED STATES PATENTS 2,002,139    5/1935    Des Rosiers.
2,078,703    4/1937    Wisniewski.

DUANE A. REGER, *Primary Examiner.*

UNITED STATES PATENT OFFICE
CERTIFICATE OF CORRECTION

Patent No. 3,388,773

June 18, 1968

Clark E. Quinn

It is certified that error appears in the above identified patent and that said Letters Patent are hereby corrected as shown below:

Column 4, line 23, cancel "to"; line 31, "axail" should read -- axial --; line 45, after "including" insert -- a first --.

Signed and sealed this 11th day of November 1969.

(SEAL)
Attest:

Edward M. Fletcher, Jr.

Attesting Officer

WILLIAM E. SCHUYLER, JR.

Commissioner of Patents